Patented Oct. 19, 1948

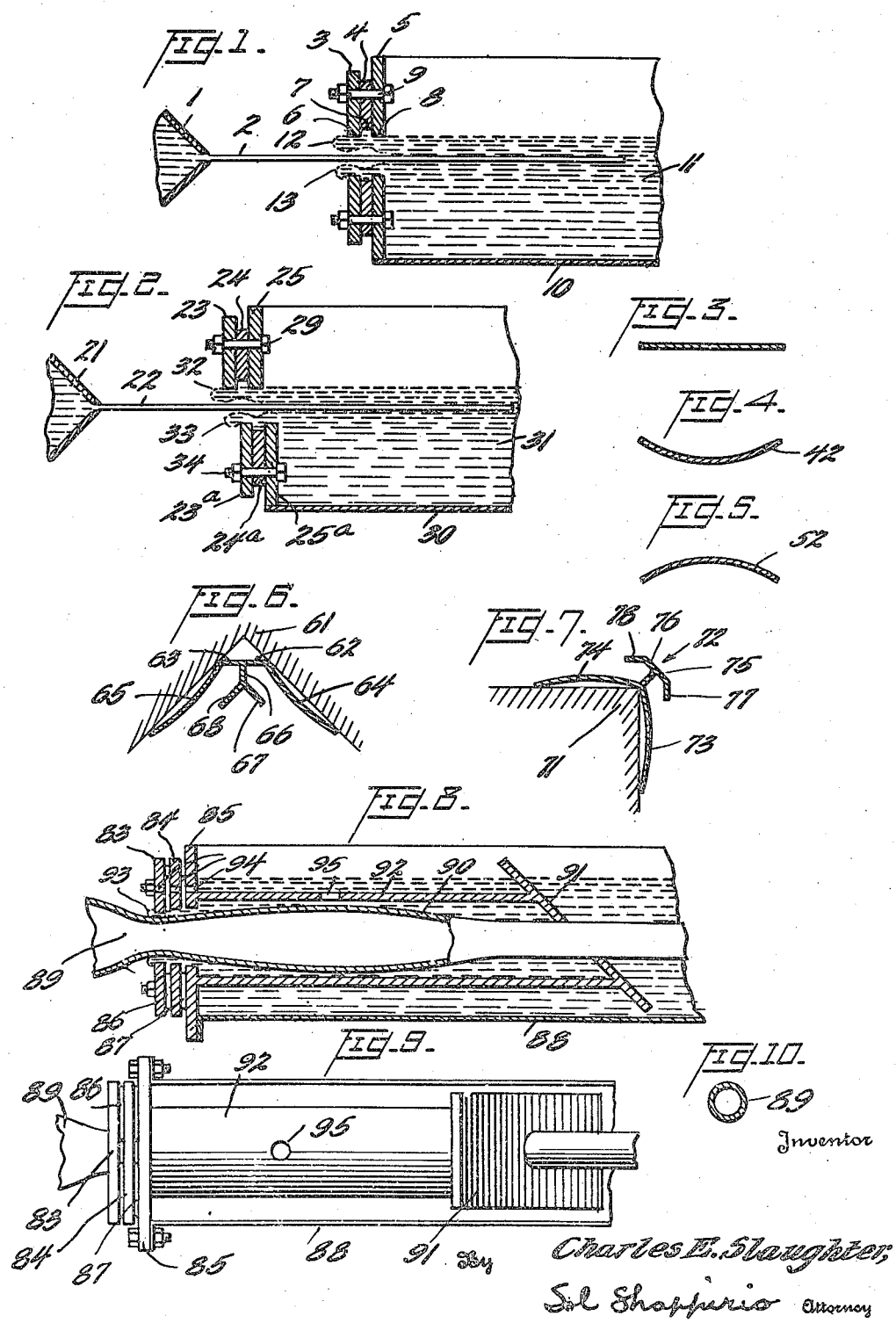

2,451,986

UNITED STATES PATENT OFFICE 2,451,986

THERMOPLASTIC EXTRUSION METHOD

Charles E. Slaughter, New Canaan, Conn., assignor to Extruded Plastics, Inc., Norwalk, Conn., a corporation of Connecticut Application May 25, 1943, Serial No. 488,458

4 Claims. (Cl. 18—55)

This invention relates to the production of functional shapes in thermoplastic materials by continuous extrusion and more particularly to methods for the production of functional shapes within closely controlled tolerances.

The commercial production of plastic shapes by extrusion of thermoplastic materials presents a number of difficulties. In a usual process of such extrusion as practiced today, the thermoplastic material is shaped by extrusion through a die of predetermined design, the extruded product received on a moving belt, and the attempt is made to hold the article to the shape desired, by means of a blast of air or a combination of blasts of or individual jets of cold air. Even with the most simple of shaped articles, it is extremely difficult to produce satisfactory products by such methods, since the resulting products produced in such commercial methods vary substantially from the exact section desired. And even in such cases one is limited to the use of a relatively hard and quick setting thermoplastic material. With softer types of thermoplastic materials, the section will not generally have sufficient rigidity to hold to shape during the cooling process. And the difficulties of producing shapes of closely controlled tolerances is particularly evident in connection with complicated shapes where the article possesses a number of walls or faces at angles one to the other. In such complicated articles it is practically impossible to extrude thermoplastic material particularly from softer types of thermoplastics which will hold the necessary shape or contour but they collapse under their own weight at the extruding temperature usually employed such as 400 to 450° F.

The difficulties experienced in the production of functional shapes by extrusion of thermoplastics is not at all limited to the extrusion of articles having two or more walls or faces at angles one to the other, but is also experienced in the production of tubing from thermoplastics. In the extrusion of tubing from thermoplastics, the heated material is expressed through a die member having an orifice ordinarily of the precise shape of the tubing it is desired to produce. Fluid pressure is introduced into the tube through a cross-head to prevent the tubing from collapsing internally since the tubing is not self-supporting at the time of extrusion and does not become self-sustaining until cooled. It is fairly common practice to extrude the tubing downwardly into a cooling medium whereby it is chilled quickly to set it before it has a chance to deform materially but extrusion directly into water or similar coolant causes enormous uncontrolled shrinkages. Further it is not possible to produce tubing in this way of the degree of tolerance necessary and it is not only out of round frequently but of varying wall thickness. Nor is it possible by such methods to produce tubing of any substantial size such as ⅜ inch internal diameter or larger which does not vary in cross-section along its length substantially beyond the tolerances permitted in better practice.

Among the objects of the present invention is the production of functional shapes from thermoplastic materials by continuous extrusion methods which are commercially practicable.

Other objects include the production of functional shapes and articles of substantially uniform cross-section within close degrees of tolerance.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In connection with that more detailed description, there is shown in the accompanying drawings, in Figure 1, a side sectional elevation illustrating apparatus in accordance with the present invention; in Figure 2, a side sectional elevation of a modification of apparatus utilized in connection with the present invention; in Figure 3, a transverse section through an extruded tape that may be produced in accordance with the present invention; in Figure 4, a transverse section through a concave extruded tape that may be produced in accordance with the present invention; in Figure 5, a transverse section through a convex extruded tape produced in accordance with the present invention; in Figure 6, a section through an inside corner shape in position in a corner; in Figure 7, a section through an outside corner wallboard trim shape in position on an outside corner; in Figure 8, a side sectional elevation illustrating apparatus for producing tubing in accordance with the present invention; in Figure 9, a plan view of the apparatus shown in Figure 8; and in Figure 10, a transverse section through tubing produced in accordance with the present invention.

In accordance with the present invention, extruded articles of close degree of tolerance, continuously and safely reproducing the section desired, is produced by control of the application of coolant to the extruded article immediately after its extrusion from the die while still in a hot plastic condition from the hot extrusion or expression step while in non-self-supporting condition, the application of coolant being controlled for a distance sufficient to convert the extruded product into self-sustaining condition with a close degree of tolerance. The point of application of coolant to the extruded product is as close to the extrusion die or point of extrusion as is conveniently possible but necessarily varies with the conditions of extrusion and the nature of the material being extruded. The distance between die and the first point of application of coolant (as by a jig) may be used to control the article. For example, in making extruded tape with a 2 inch width tape die, if the jig is ½ inch from the die, an extruded strip of about 1¾ inches in width is obtained. By pulling the jig back to a distance of 2 inches from the die and speeding up the conveyor (which receives the extruded article) so as to draw the material down before it is cooled by the coolant, a strip of 1 inch width may be obtained from the same die. The distance that the extruded article travels from the point of extrusion or extrusion die to the point where it first meets coolant may be as little as ¼ inch to 1 inch in tubing of substantial size for example, or it may be as much as 2 inches in very small tubing, and may be 2 inches or more in functional shapes having several walls or flanges at angles to each other. The distance over which the application of coolant to the extruded article is carefully determined before immersion of the extruded article in a body of coolant should be sufficient so that the extruded article has reached the final shape desired with a close degree of tolerance and is sufficiently rigid to retain that shape. Here again such distance depends on the nature of the article being extruded. With a flat tape a distance of 2 inches is sufficient. With more complicated shapes including several faces or surfaces at angles to each other, the distance may be 4 inches. This distance is particularly concerned with the nature of the plastic material that is being fabricated. For example, in the fabrication of very hard stock into tubing which stock sets rapidly as it enters the coolant, a distance of travel or space between the first plate which receives the extruded tubing and the final shaping plate may be 4 inches. On the other hand, for soft materials or for a shape that requires adequate setting as for instance, square tubing, the distance may be from 12 to 18 inches. As noted, the article at the end of this time has reached an almost rigid state, and it may then be immersed in a body of coolant.

In controlling the application of the coolant to the hot extruded plastic, the extruded shape is taken from the point of extrusion or extruding die through one or more plates having openings therein through which the extruded article may pass, the openings in such plates controlling the shape of the article and the application of the coolant to the extruded product, coolant desirably being applied so that it is between the walls forming the opening or openings in the plate or plates and the extruded article. The coolant is desirably permitted to extend just beyond the first plate that is, the plate nearest the extrusion die, and such coolant forms a meniscus at the point where the coolant first meets the extruded hot plastic. By having the extruded hot plastic first meet a meniscus of liquid coolant in this way, close control of the characteristics and contour of the extruded plastic can be maintained as for example, with a material such as cellulose acetate butyrate ("Tenite II"), such material is at a temperature of about 400° F. at the point of extrusion. Water illustrates an excellent form of coolant that may be applied. When the extruded plastic first meets the coolant such as water, it is above the boiling point of water on its external surface evidenced by the fact that the water is vaporized at the point of contact. When water is used as the coolant, the temperature of the main body of water may be approximately 55° F. The manner of application of the coolant will be illustrated below.

Referring to Figure 1 of the drawings, reference will be made to the extrusion of a flat tape of thermoplastic material to illustrate the present invention. As shown in that figure, the thermoplastic is extruded from the die 1 in the form of a tape 2, and passes through a series of plates 3, 4, 5, having openings 6, 7, 8 respectively therein, shaped to receive and produce such flat tape. The plates 3, 4, 5 may be bolted together as shown at 9 and form the end wall of the receptacle 10 which contains the main body of coolant 11. The openings 6, 7, 8 in the plates 3, 4, 5 are just large enough to permit some of the coolant to pass between the extruded plastic and the walls forming the openings in said plates, producing a meniscus 12 on the top of the tape and a meniscus 13 on the bottom of the tape. As indicated from the plates, the tape after leaving plate 5, is in an almost rigid state sufficient to retain the shape which it has received and enters then into the main body of coolant 11.

It will be seen that in the operation of the apparatus of Figure 1 and the application of coolant as set forth therein, both the upper and lower surfaces of the tape are immersed in the coolant such as water, at exactly the same instant so that a flat tape as illustrated in Figure 3 is produced.

In producing such extruded tape and any other functional shape desired, the manner of application of the coolant can be used to control the exact contour and maintain the necessary tolerance. Thus, if the water applied at the top of the tape is higher in temperature than that applied to the under surface of the tape, a concave section will be produced of the character set forth and shown in Figure 4. On the other hand, if the water at the top is lower in temperature than that applied to the bottom of the tape, a convex section as illustrated in Figure 5 will be produced. This control can be effected either by having a different body of coolant at a different temperature applied to the desired surface of the tape or other functional shape being produced, or by the rate at which the coolant is removed from the surface with which it is in contact. The more rapidly the coolant is removed from the surface with which it is in contact, the greater the relative cooling effect and this expedient can be utilized in controlling the gradient of temperature effect at the different surfaces of the tape and the resulting contour, since the colder the coolant the more shrinkage and a similar effect is obtained by rapid removal of the coolant from some one surface as compared with its application to another.

Or control of the contour can be determined by a difference in time of application of coolant to the various surfaces of the extruded article. Thus if one surface is cooled a fraction of a second sooner than another surface as by having the meniscus move forward or back from 1/16 inch or more, a difference in relative effect is obtained. This is illustrated in Figure 2.

As shown in Figure 2, the plastic is extruded from the die 21 in the form of a flat tape 22 and passes through plates 23, 24, 25, above the tape 22 slightly in advance of the plates 23a, 24a, 25a, below the tape 22, so that the meniscus 32 of coolant above the tape 22 is in advance of the meniscus 33 on the underneath surface of the tape. Here again the plates 25 and 25a may constitute the end walls of the container 30 containing the main body of coolant 31 and the extruded tape passing from the plate into the main body of coolant. The several sets of plates may be bolted together as illustrated respectively, at 29 and 34 to form what may be called a jig of superposed plates used for controlling the application of coolant. In the device as shown in Figure 2, since the coolant is applied to the top of the tape in advance of its application to the bottom of the tape, a convex section is produced as illustrated in Figure 5. The relation of the several groups of plates and the formation of meniscus may be reversed so that the first meniscus which meets the extruded tape is below the tape in which event the concave tape illustrated in Figure 4 will be obtained.

These methods and apparatus may be utilized in producing the ideal curvature in tapes and other functional articles having walls or faces at angles one to the other since a meniscus-shaped contour or curvature may be given to any desired wall or flange of the extruded functional shape for any desired purpose as where it is desired to have that wall or face hug a flat surface as closely as possible. Thus the convex and concave tapes 52 and 42 respectively illustrated in Figures 5 and 4 may be utilized as edging for linoleum where the meniscus-shaped curvature, slightly convex enables it to hug a flat surface such as a flat table surface.

Other illustrations of the application of this invention is illustrated in Figures 6 and 7 in connection with inside and outside corner wallboard trim sections. As shown in Figure 6, an inside wall corner 61 on which it is desired to position wallboard, is provided with an inside corner section 62, having a flat base 63 from each end of which extends a side 64, 65, the sides 64 and 65 being at substantially right angles to each other. From the center of the base 63 a projection 66 extends provided at its end with bifurcations 67, 68 respectively paralleling the walls or sides 64 and 65. A section of wallboard is held in position by being forced between the side 64 and the bifurcation or arm 67 or between the side 65 and the corresponding bifurcation 68. The sides 64 and 65 are given a meniscus-shaped concave contour by the application of coolant in the manner set forth above.

In the outside corner wallboard holding trim section shown in Figure 7, the outside corner 71 is provided with a section for holding wallboard 72 having sides 73 and 74 at substantially right angles to each other, with a projection 75 extending upwardly therefrom provided at its end with a cross portion 76 having arms 77, 78 respectively parallel with the sides or walls 73, 74. The wallboard is held in position by being forced between the side 73 and coacting arm 77 or the corresponding side 74 and coacting arm 78. In order that the side portions 73 and 74 may closely hug the walls forming the corner 71, such sides 73 and 74 are given a meniscus controlled convex contour as illustrated by the application of coolant in accordance with the description set forth above.

It will be understood that the openings in the plates 3, 4, 5 and other plates illustrated above is substantially for the production of the flat tape as illustrated in Figure 3, and the convex or concave contour given to such tape by variation in the application of coolant is exhibited by the tape immediately as it leaves the plurality of plates when it has reached its substantially rigid state where it retains the contour that is given to it as it enters the main body of coolant. Since sections are produced by extrusion at a rate which may be for example, 20 feet a minute, it will be seen that a fraction of an inch differential in the application of the meniscus curve of coolant will make a tremendous difference in the final shape and absolute control of the application of coolant during the first 2 inches of travel for functional shapes as illustrated above is sufficient to control the final shape of the article.

The utilization of the invention in the production of tubing that is uniform, strain free, equally shrunk, and of close tolerance, illustrates other factors involved in the production of extruded sections from thermoplastc material, which material as it emerges from the die is in the form of a molasses-like material that is entirely unself-sustaining and does not become self-sustaining until cooled substantially below the extrusion temperature. By the application of the invention and the control of the coolant as it is applied to the extruded section such as tubing, a uniform, strain free product is produced. By the action of the meniscus, substantially instantaneous cooling action is obtained at the first plate through which the section is drawn or is passed.

A number of factors enter into the application of the coolant in order to produce uniform, strain free products. For example, it is important to contact the entire periphery of the extruded tubing or similar section, while still very hot, with a coolant so that there is simultaneous application of coolant to the entire periphery of the tubing. This results in uniform shrinkage and avoidance of strain internally in the section. It is also desirable to maintain a thin film of fluid coolant, whether in liquid or gaseous form, between the draw plates and the tubing being drawn or expressed therethrough. The presence of such film may be readily provided for by flaring or tapering the plates at the openings through which the section is drawn through such plates, and the presence of the meniscus of liquid not only insures simultaneous application of coolant to the entire periphery of the tubing or other section but prevents seizing between the plastic and the material of the plates, usually metal. The plastic as it enters the first plate will generally be at a temperature of about 400° F. or possibly as low as 325° F. for some plastics or resins. This heat is sufficient to form a layer of steam between the plate and the plastic.

In connection with the extrusion of sections of the character of tubing, it is important also, to have the tubing pass through a final plate set at other than a right angle to the line of draw in order to prevent any seizure at this point. The temperature of the tubing or other section at the instant it passes through the final draw plate and the rate of travel of the tube are important factors entering into the production of the desired shape of uniform section. The tubing or other section must be hard enough at this point to hold to shape as it emerges from the final draw plate but must be plastic enough as it enters the plate so that it can be shaped to the final form desired. It emerges from this final plate in a practically rigid state or almost rigid state which it retains.

Other factors involved will appear from a description of the production of tubing as illustrated in Figures 8 to 10 of the drawings. Referring to those figures, the apparatus shown in Figures 8 and 9 may be said to consist of a plurality of preliminary draw plates 83, 84 and 85. The plates may be separated from each other by split spacing rings 86 and 87. The plate 85 may as illustrated, form the end of the receptacle 88 which carries the main body of coolant such as water supplied at a temperature of about 55° F. The tubing 89 as it is expressed from the orifice of an extrusion die (not shown) is expanded by air or other fluid forced into the tubing through the cross-head holding the extrusion die. The tubing 89 in expanded condition is drawn down and enters the opening in the first draw plate 83 and thereafter passes successively through similarly shaped openings in each of the succeeding draw plates 84 and 85.

The opening through the set of draw plates 83, 84 and 85, may be said to constitute a frustum of a cone, the taper being preferably at an angle of about 5°. Thus the tube 89 enters the opening in the preliminary draw plates at the point of least diameter of the frustum and effectively prevents cooling liquid from running away around the tubing through the opening in the first draw plate 83. At the same time, owing to the increasing diameter of the openings through the draw plates 83, 84 and 85, water flows from the receptacle 88 around the tubing and a film of water is interposed between the tubing and the metal of the draw plates. The spacing rings 86 and 87 are split and open at the top and bottom, and permit water or other coolant being used to flow through the opening in those rings 86 and 87 so that a steady flow of coolant is contacted with the relatively hot plastic entering the draw plates.

As shown in Figure 8, the openings in the plates 83, 84 and 85 are just sufficient to permit a meniscus of coolant as shown at 93 to form around the tubing as it enters the first draw plate and since the application of this coolant through the meniscus curve is simultaneous at the entire periphery of the extruded tubing, uniform initial application of coolant is obtained. As the tubing passes the first plate 83 it enters the circle of water existing between plates 83 and 84, then passes the plate 84 which serves to hold the meniscus curve and finally passes through the plate 85. With very heavy wall tubing or other analogous sections, where it is not possible to conduct the heat away from the skin of the tubing sufficiently rapidly to keep the metal of the draw plate from heating up too much, a small amount of water may be permitted to bleed around the outside of the front plate through openings 94 in those plates. The small amount of water which thus bleeds around the first plate 83 is sufficient to produce shrinkage of the heavy wall plastic tube and to reduce the temperature of the skin of such tube before it enters the first plate 83. The lowering of temperature is sufficient to permit the usual film of water to remain between the metal of the plate and the plastic.

Sufficient air is introduced into the tubing 89 so that it is re-expanded somewhat after passing through the plates 83, 84 and 85. Tubing in expanded condition as illustrated at 90 is then passed through an opening in the final draw plate 91, which opening is the exact size of the finished section desired. This final draw plate 91 is set at other than a right angle to the line of draw of the tubing 89 in such manner that one side of the tubing 89 is no longer in contact with the draw plate 91 when the opposite side of the tube contacts that draw plate 91. It is convenient to associate the various plates together as a unit and for this purpose a tubular member 92 may be used to join the final draw plate 91 with the plate 85. The tubular member 92 may desirably be provided with an opening 95 through which water or other coolant may flow from the main supply into the member 92 and thence into openings in the draw plates 83, 84 and 85. Suitable take-up means (not shown), for example, a large driven winding reel, may be provided to receive the tubing as it emerges from the end of the cooling receptacle 88 in which it is immersed after receiving the initial cooling treatment referred to above.

The several plates 83, 84 and 85 associated through the tubular member 92 with the final draw plate 91 constitute a jig or entity which can be utilized as an element. The length of the tubular member 92 is determined by the type of plastic that is being fabricated into tubing. On very hard stock that sets rapidly as it enters the coolant, a length of about 4 inches between the first plate 83 and the final plate 91 is satisfactory. For softer material or for a shape that requires adequate setting as for instance square tubing, the final plate 91 should be spaced from 12 inches to 18 inches from the first plate 83 since the final drawing or expression through the final plate 91 must be accomplished when the material has reached an almost rigid state.

A specific example illustrating the practice of the invention in the fabrication of tubing of ¾ inch outside diameter with a 1/16 inch thickness of wall will illustrate the invention. The tubing was made from a cellulose acetobutyrate plastic ("Tenite II"). This material was extruded at approximately 400° F. through an extrusion die with an annular orifice one inch in outside diameter and with a wall thickness of seventy thousandths of an inch. Sufficient air was introduced into the tubing to expand it to an outside diameter of about one and one-eighth inches. The tubing was pulled into a preliminary draw plate having a circular opening of eighty hundredths of an inch diameter at the point of entry of the tubing. Three preliminary draw plates were used, spaced apart about twenty thousandths of an inch. The openings in the three plates were arranged in the line of draw and were gradually enlarged at an angle of 5° from the point of entry of the tubing into the first draw plate to the point of its exit through the three preliminary draw plates. The air pressure in the tubing was sufficient to enlarge it slightly after it emerged from the third draw plate and the enlarged tubing was then drawn through a plate set at an angle of 45° to the line of draw. The opening in this final draw plate was exactly ¾ inch in diameter, in the line of draw. The tubing was extruded at a rate of 50 pounds per hour and was drawn through the final draw plate at a speed of about 14 feet per minute. In this manner thousands of feet of tubing have been drawn which were not measurably out-of-round and which varied in diameter less than one-half of one per cent.

Desirably, the extrusion die has a somewhat larger diameter than that of the finished tubing since this expedites the maintenance of contact between the tubing and the first draw plate, thereby controlling the escape of coolant. This relationship of die diameter to tubing diameter is largely determined by wall thickness of the tubing under extrusion and is inversely proportional thereto. Thus, the heavier the tubing wall, the smaller the die diameter in comparison to that of the first draw plate; and conversely. For example, on very heavy wall tubing, e. g. that having ¾ inch outside diameter and ¼ inch diameter hole, a die as little as twenty thousandths of an inch larger in diameter than the first draw plate may be employed. With thinner walled tubing, the die may have a diameter much larger than that of the first draw plate. A contributing factor in the establishment of the above described ratio of diameters is the difficulty encountered in compress-drawing heavy wall tubing as compared to thin wall tubing.

The temperature of the coolant such as cooling liquid employed to set the plastic and the rate of draw of the tubing are inter-related functions which must be carefully adjusted to give proper results. Cooling liquids other than water may be employed such as glycerine, hydrocarbon oils, etc., so long as the coolant is substantially non-reacting with the particular plastic being drawn. Although liquid coolants are desirable, various gases inert to the plastic being fabricated can be employed, particularly where the tubing size is relatively small and the wall thickness is not too great.

As used herein, the term "tube" or "tubing" refers generically to hollow elongated articles of uniform cross-section and is not to be construed as restricted only to such articles of circular section. For example, hollow articles of square, triangular, hexagonal or other desired corss-section can be formed readily in accordance with the present invention. Thus square tubing ¾ inch on a side with a ¹⁄₁₆ inch wall of uniform cross-section may be produced from tubing extruded initially from a die having a circular annular orifice and then drawn through plates to produce the square tubing. The production of tubing of polygonal cross-section from extruded annular tubing is of great advantage since it eliminates the necessity for having special extrusion dies for each shape of tubing desired. Since the dies are expensive this is a great advantage.

The angle of taper of the opening through the preliminary draw plates has been mentioned hereinabove as about 5°. While this appears to be the optimum angle, according to present practice, the invention is not restricted thereto and other angles of taper may be used, as for example, from about 2° to about 10°, depending upon the thickness of the draw plates, the thickness of the wall section of the tubing, the particular plastic being worked, the speed of drawing, and other factors involved. Likewise, the angle at which the final draw plate is set with respect to the line of draw may vary from that hereinbefore specifically mentioned. It is only necessary that the tubing be subjected to force on one side before being contacted with the draw plate on the opposite side. Depending upon the thickness of the plate and the size of tubing being drawn, this angle may be from about 10° to about 80°, but preferably is from 30° to 60°.

While in the production of tubing as set forth above, the final draw plate is provided with an opening of the exact external shape and diameter as that desired in the finished product, some leeway is permissible as for example, five thousandth of an inch in the diameter of the opening of the final draw plate. Such difference can often be compensated for by control of temperature, rate of drawing, and other operating factors to obtain tubing within tolerance limits satisfactory for all practical purposes.

The production of functional shapes in accordance with the present invention enables the use of any desired thermoplastic materials that may be extruded, to be employed. Particularly synthetic resinous materials such as cellulose derivatives including the esters, particularly cellulose acetate, cellulose nitrate, cellulose acetate butyrate, and the cellulose ethers such as ethyl cellulose, benzyl cellulose; polymerized vinyl materials such as polymerized vinyl acetate, and vinylidene chloride, copolymers of vinyl chloride and vinyl acetate, polymerized styrenes, methacrylate and methyl methacrylate resins, and other thermoplastic and resinous compositions that may be extruded in continuous lengths, including the vinyl resins and nylon type resins.

The term "meniscus-shaped" is utilized herein to define the structure of the section which has been shaped by the operation of meniscus applied coolant which results in the particular structure as shown herein which is of great moment in the production of satisfactory articles by extrusion methods.

Having thus set forth my invention, I claim:

1. The method of fabricating extruded thermoplastic articles which comprises extruding heated thermoplastic material through a die and while still in plastic condition from the hot extruding step, passing the extruded product through a plate having a contour-determining opening in the wall thereof through which the extruded product may pass, the contour-determining opening being complementary to the shape of the extruded article and just large enough to permit coolant to pass between the extruded plastic and the walls forming the opening in the plate and supplying a thin layer of liquid coolant to the extruded product between the wall forming the opening and the extruded product at any points where the extruded product and plate would contact in the absence of said coolant, the coolant extending as a meniscus on the product beyond the plate in the direction of the extrusion die.

2. The method of fabricating extruded thermoplastic articles which comprises extruding heated thermoplastic material through a die and while still in plastic condition from the hot extruding step, passing the extruded product through a plate having a contour-determining opening in the wall thereof through which the extruded product may pass, the contour-determining opening being complementary to the shape of the extruded article and just large enough to permit coolant to pass between the extruded plastic and the walls forming the opening in the plate supplying a thin layer of liquid coolant to the extruded product between the wall forming the opening and the extruded product at any points where the extruded product and plate would contact in the absence of said coolant, the coolant extending as a meniscus on the product beyond the plate toward the extrusion die, and then immersing the extruded product in a body of liquid coolant.

3. The method of controlling the configuration of extruded articles which comprises extruding heated thermoplastic material through a die and while still in plastic condition from the hot extruding step applying a thin layer of liquid cooling medium to different portions of the exposed surfaces of the extruded article, there being a temperature gradient between the medium applied to said different portions of the surfaces whereby the functional shape of the article is determined.

4. The method of controlling the configuration of extruded articles which comprises extruding heated thermoplastic material through a die in the form of an article having at least two exposed surfaces and while still in plastic condition from the hot extruding step, applying a thin layer of liquid cooling medium to each of the exposed surfaces, the cooling medium being applied to one of the surfaces in advance of its application to the other, whereby the functional shape of the article is determined.

CHARLES E. SLAUGHTER.

REFERENCES CITED

The following references are of record in the file of this patent:

UNITED STATES PATENTS

| Number | Name | Date |
|---|---|---|
| 1,740,029 | Moomy | Dec. 17, 1929 |
| 1,802,605 | Kemp | Apr. 28, 1931 |
| 1,952,038 | Fischer | Mar. 20, 1934 |
| 1,956,564 | Crane | May 1, 1934 |
| 2,287,825 | Postlewaite | June 30, 1942 |
| 2,294,555 | Hendrie | Sept. 1, 1942 |
| 2,308,638 | Bathis et al. | Jan. 19, 1943 |